United States Patent
Rawat et al.

(10) Patent No.: US 9,881,040 B2
(45) Date of Patent: Jan. 30, 2018

(54) TRACKING DATA OF VIRTUAL DISK SNAPSHOTS USING TREE DATA STRUCTURES

(71) Applicant: VMware, Inc., Palo Alto, CA (US)

(72) Inventors: Mayank Rawat, Sunnyvale, CA (US); Ritesh Shukla, Saratoga, CA (US); Li Ding, Cupertino, CA (US); Serge Pashenkov, Los Altos, CA (US); Raveesh Ahuja, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 336 days.

(21) Appl. No.: 14/831,808

(22) Filed: Aug. 20, 2015

(65) Prior Publication Data

US 2017/0052717 A1   Feb. 23, 2017

(51) Int. Cl.
  *G06F 3/06*   (2006.01)
  *G06F 17/30*  (2006.01)

(52) U.S. Cl.
  CPC ........ *G06F 17/30327* (2013.01); *G06F 3/067* (2013.01); *G06F 3/0608* (2013.01); *G06F 3/0641* (2013.01); *G06F 17/30088* (2013.01)

(58) Field of Classification Search
  CPC ............. G06F 17/30327; G06F 3/0608; G06F 3/0641; G06F 3/067; G06F 17/30088
  See application file for complete search history.

(56) References Cited

U.S. PATENT DOCUMENTS

| | | | |
|---|---|---|---|
| 8,775,773 B2 | 7/2014 | Acharya et al. | |
| 9,720,947 B2* | 8/2017 | Aron | G06F 17/30327 |
| 9,740,632 B1* | 8/2017 | Love | G06F 12/1018 |
| 2015/0058863 A1 | 2/2015 | Karamanolis et al. | |
| 2016/0210302 A1* | 7/2016 | Xia | G06F 3/0619 |

* cited by examiner

*Primary Examiner* — Eric S Cardwell
(74) *Attorney, Agent, or Firm* — Patterson & Sheridan, LLP (57) ABSTRACT

User data of different snapshots for the same virtual disk are stored in the same storage object. Similarly, metadata of different snapshots for the same virtual disk are stored in the same storage object, and log data of different snapshots for the same virtual disk are stored in the same storage object. As a result, the number of different storage objects that are managed for snapshots do not increase proportionally with the number of snapshots taken. In addition, any one of the multitude of persistent storage back-ends can be selected as the storage back-end for the storage objects according to user preference, system requirement, snapshot policy, or any other criteria. Another advantage is that the storage location of the read data can be obtained with a single read of the metadata storage object, instead of traversing metadata files of multiple snapshots.

20 Claims, 4 Drawing Sheets

TRACKING DATA OF VIRTUAL DISK SNAPSHOTS USING TREE DATA STRUCTURES

BACKGROUND

In a virtualized computing environment, virtual disks of virtual machines (VMs) running in a host computer system ("host") are typically represented as files in the host's file system. To back up the VM data and to support linked VM clones, snapshots of the virtual disks are taken to preserve the VM data at a specific point in time. Frequent backup of VM data increases the reliability of the VMs. The cost of frequent backup, i.e., taking frequent snapshots, is high because of the increase in associated storage costs and adverse impact on performance, in particular read performance because each read will have to potentially traverse each snapshot level to find the location of the read data.

Solutions have been developed to reduce the amount of storage consumed by snapshots. For example, snapshots can be backed up incrementally by comparing blocks from one version to another and only the blocks that have changed from the previous version are saved. Deduplication has also been used to identify content duplicates among snapshots to remove redundant storage content.

Although these solutions have reduced the storage requirements of snapshots, further enhancements are needed for effective deployment in cloud computing environments where the number of VMs and snapshots that are managed is quite large, often several orders of magnitude times greater than deployment in conventional data centers. In addition, storage technology has advanced to provide a multitude of persistent storage back-ends, but snapshot technology has yet to fully exploit the benefits that are provided by the different persistent storage back-ends.

DETAILED DESCRIPTION

According to embodiments, user data of different snapshots for the same virtual disk are stored in the same storage object, which may take the form of a file in a host file system, a file in a network file system, and object storage provisioned as a virtual storage area network (SAN) object, a virtual volume object, or a cloud storage object. Similarly, metadata of different snapshots for the same virtual disk are stored in the same storage object, and log data of different snapshots for the same virtual disk are stored in the same storage object. As a result, the number of different storage objects that are managed for snapshots do not increase proportionally with the number of snapshots taken. In addition, any one of the multitude of persistent storage back-ends can be selected as the storage back-end for the storage objects containing data for the snapshots. As a result, the form of the storage objects containing data for the snapshots may be selected according to user preference, system requirement, snapshot policy, or any other criteria. Another advantage is that the storage location of the read data can be obtained with a single read of the metadata storage object, instead of traversing metadata files of multiple snapshots.

Figure 1:
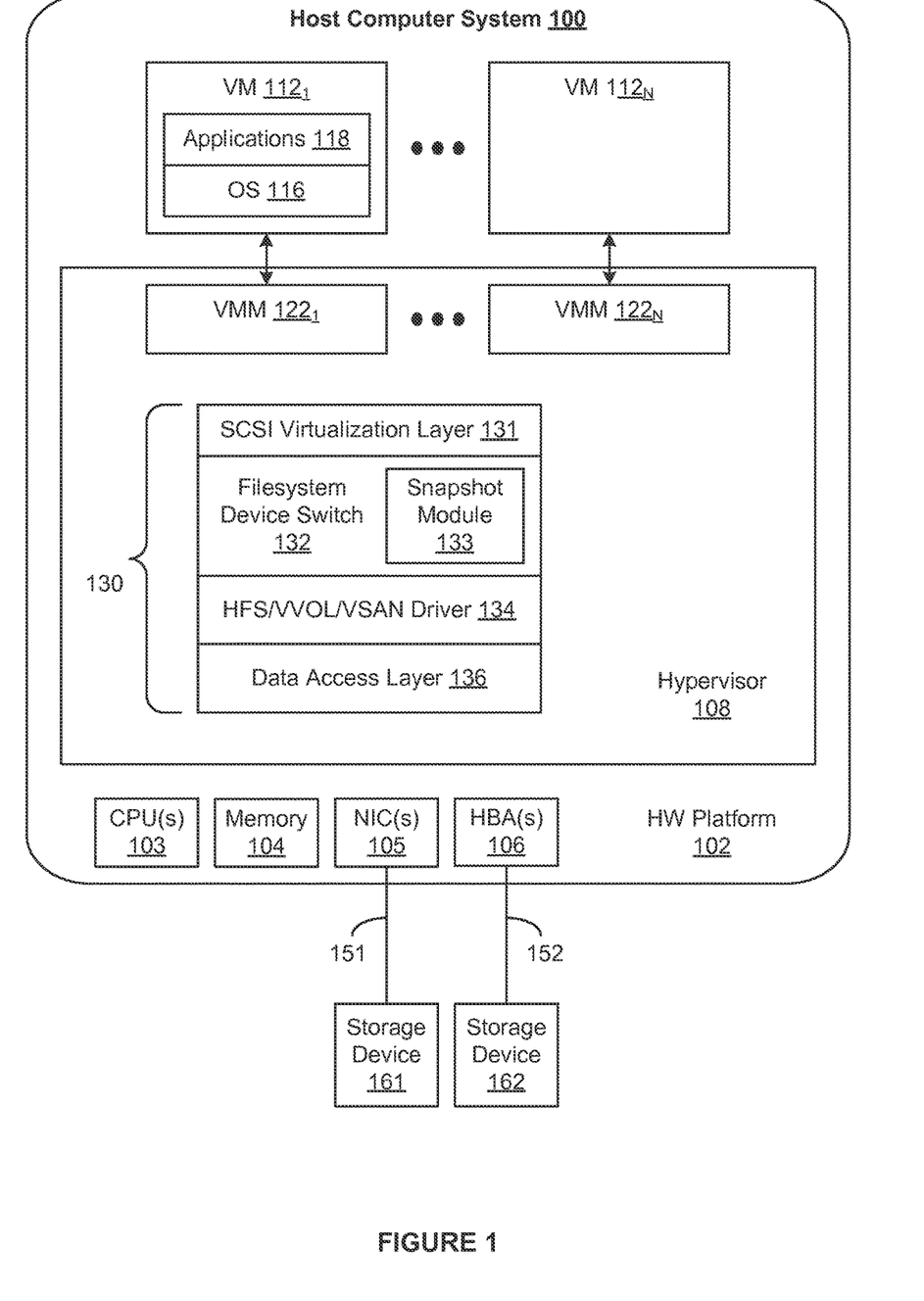
FIG. 1 is a block diagram of a virtualized host computer system that implements a snapshot module according to embodiments.

FIG. 1 is a computer system, shown as host computer system 100, having a hypervisor 108 installed on top of hardware platform 102 to support the execution of virtual machines (VMs) $112_1$-$112_N$ through corresponding virtual machine monitors (VMMs) $122_1$-$122_N$. Host computer system 100 may be constructed on a conventional, typically server-class, hardware platform 102, and includes one or more central processing units (CPUs) 103, system memory 104, one or more network interface controllers (NICs) 105, and one or more host bus adapters (HBAs) 106. Persistent storage for host computer system 100 may be provided locally, by a storage device 161 (e.g., network-attached storage or cloud storage) connected to NIC 105 over a network 151 or by a storage device 162 connected to HBA 106 over a network 152.

Each VM 112 implements a virtual hardware platform in the corresponding VMM 122 that supports the installation of a guest operating system (OS) which is capable of executing applications. In the example illustrated in FIG. 1, the virtual hardware platform for VM $112_1$ supports the installation of a guest OS 116 which is capable of executing applications 118 within VM $112_1$. Guest OS 116 may be any of the well-known commodity operating systems, such as Microsoft Windows®, Linux®, and the like, and includes a native file system layer, for example, either an NTFS or an ext3FS type file system layer. Input-output operations (IOs) issued by guest OS 116 through the native file system layer appear to guest OS 116 as being routed to one or more virtual disks provisioned for VM $112_1$ for final execution, but such IOs are, in reality, reprocessed by IO stack 130 of hypervisor 108 and the reprocessed IOs are issued through NIC 105 to storage device 161 or through HBA 106 to storage device 162.

At the top of IO stack 130 is a SCSI virtualization layer 131, which receives IOs directed at the issuing VM's virtual disk and translates them into IOs directed at one or more storage objects managed by hypervisor 108, e.g., virtual disk storage objects representing the issuing VM's virtual disk. A file system device switch (FDS) driver 132 examines the translated IOs from SCSI virtualization layer 131 and in situations where one or more snapshots have been taken of the virtual disk storage objects, the IOs are processed by a snapshot module 133, as described below in conjunction with FIGS. 4C and 4D.

The remaining layers of IO stack 130 are additional layers managed by hypervisor 108. HFS/VVOL/NSAN driver 134 represents one of the following depending on the particular implementation: (1) a host file system (HFS) driver in cases where the virtual disk and/or data structures relied on by snapshot module 133 are represented as a file in a file system, (2) a virtual volume (VVOL) driver in cases where the virtual disk and/or data structures relied on by snapshot module 133 are represented as a virtual volume as described in U.S. Pat. No. 8,775,773, which is incorporated by reference herein in its entirety, and (3) a virtual storage area network (VSAN) driver in cases where the virtual disk and/or data structures relied on by snapshot module 133 are represented as a VSAN object as described in U.S. patent application Ser. No. 14/010,275, which is incorporated by reference herein in its entirety. In each case, driver 134 receives the IOs passed through filter driver 132 and translates them to IOs issued to one or more storage objects, and provides them to data access layer 136 which transmits the IOs to either storage device 161 through NIC 105 or storage device 162 through HBA 106.

It should be recognized that the various terms, layers and categorizations used to describe the virtualization components in FIG. 1 may be referred to differently without departing from their functionality or the spirit or scope of the invention. For example, VMMs 122 may be considered separate virtualization components between VMs 112 and hypervisor 108 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. It should also be recognized that the techniques described herein are also applicable to hosted virtualized computer systems. Furthermore, although benefits that are achieved may be different, the techniques described herein may be applied to certain non-virtualized computer systems.

Figure 2:
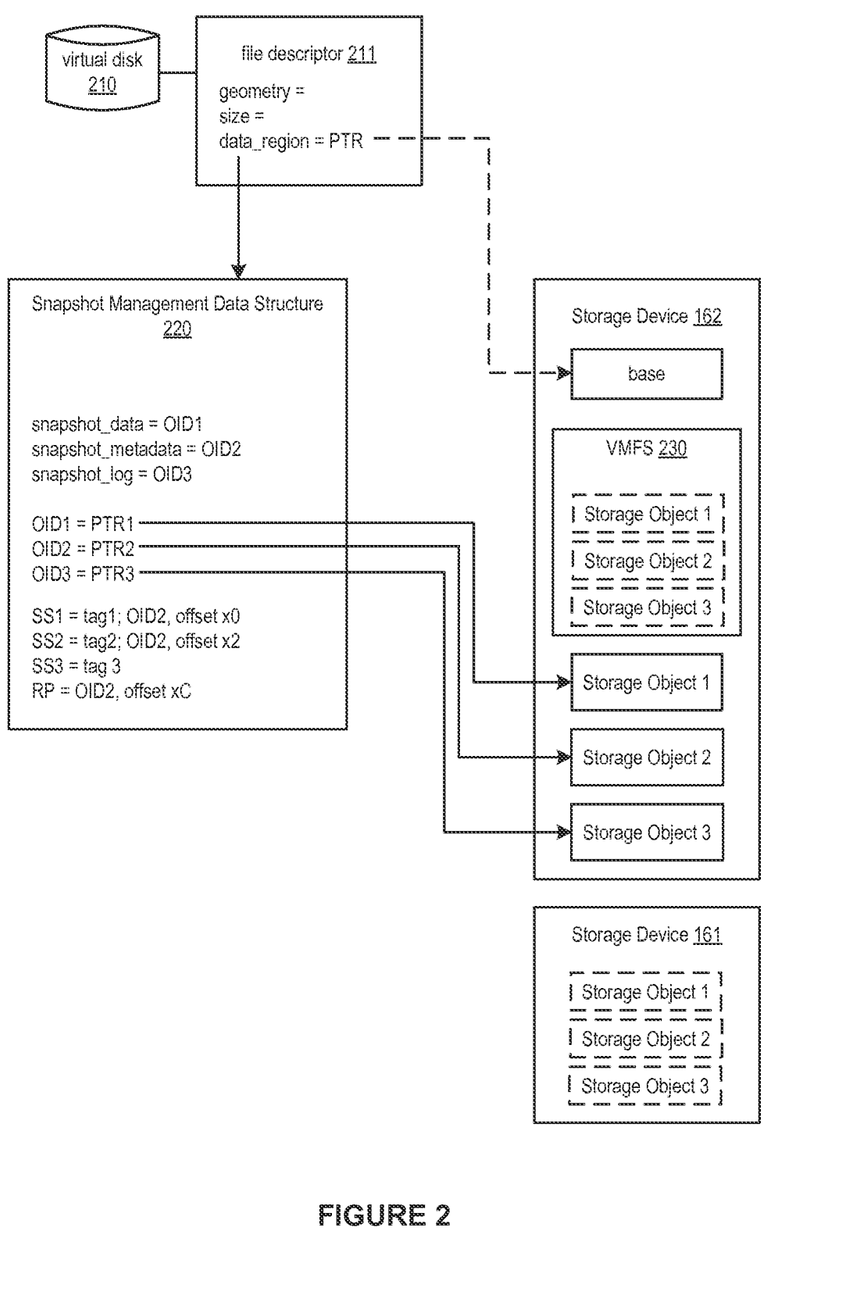
FIG. 2 is a schematic diagram that illustrates data structures for managing virtual disk snapshots according to an embodiment.

FIG. 2 is a schematic diagram that illustrates data structures for managing virtual disk snapshots according to an embodiment. In the embodiment illustrated herein, the virtual disk for a VM (shown in FIG. 2 as virtual disk 210) is assumed to be a file that is described by a file descriptor in the host file system (shown in FIG. 2 as file descriptor 211). Each file descriptor of a virtual disk contains a pointer to a data region of the virtual disk in storage. In the example of FIG. 2, file descriptor 211 contains the pointer PTR which points to a base data region in storage device 162. In the description that follows, this base data region in storage device 162 is referred to as "base" and locations within this base data region are specified with an offset. In other embodiments, the virtual disk may be represented as a VVOL object, a VSAN object, or other types of object stores known in the art, and described using associated descriptor objects.

In addition to file descriptor 211, the data structures for managing snapshots include a snapshot management data structure (SMDS) 220, storage object 1 which contains actual data written to virtual disk 210 after a snapshot has been taken for virtual disk 210 (hereinafter referred to as "the snapshot data storage object"), storage object 2 which contains metadata about the snapshots taken for virtual disk 210 (hereinafter referred to as "the snapshot metadata storage object"), and storage object 3 which is used to record snapshot metadata operations for crash consistency (hereinafter referred to as "the snapshot log storage object"). Storage objects 1, 2, 3 are depicted herein as object stores within storage device 162, but may be files of HFS 230 or a network file system in storage device 161. Storage objects 1, 2, 3 may be also be object stores in a cloud storage device. Regardless of the type of storage backing storage objects 1, 2, 3, storage objects 1, 2, 3 are identified by their object identifiers (OIDs) in the embodiments. SMDS provides a mapping of each OID to a location in storage. In SMDS 220, OID1 is mapped to PTR1, OID2 mapped to PTR2, and OID3 mapped to PTR3. Each of PTR1, PTR2, and PTR3 may be a path to a file in HFS 230 or a uniform resource identifier (URI) of a storage object.

SMDS is created per virtual disk and snapshot module 133 maintains the entire snapshot hierarchy for a single virtual disk in the SMDS. Whenever a new snapshot of a virtual disk is taken, snapshot module 133 adds an entry in the SMDS of that virtual disk. SMDS 220 shows an entry for each of snapshots SS1, SS2, SS3. Snapshot SS1 is the first snapshot taken for virtual disk 210 and its entry includes a tag (tag1) that contains searchable information about snapshot SS1 and a pointer to a root node of a B+ tree that records locations of the snapshot data for snapshot SS1. Snapshot SS2 is the second snapshot taken for virtual disk 210 and its entry includes a tag (tag2) that contains searchable information about snapshot SS2 and a pointer to a root node of a B+ tree that records locations of the snapshot data for snapshot SS2. Snapshot SS3 is the third snapshot taken for virtual disk 210 and its entry includes a tag (tag3) that contains searchable information about snapshot SS3. The pointer to a root node of a B+ tree that records locations of the snapshot data for snapshot SS3 is added to the entry for snapshot SS3 when the next snapshot is taken and the contents of snapshot SS3 are frozen. The contents of the nodes of all B+ trees are stored in the snapshot metadata storage object. Accordingly, the pointer in the entry for snapshot SS1 indicates OID2 as the storage object containing the B+ tree for snapshot SS1 and offset x0 as the location of the root node. Similarly, the pointer in the entry for snapshot SS2 indicates OID2 as the storage object containing the B+ tree for snapshot SS2 and offset x2 as the location of the root node.

SMDS also specifies a running point RP, which is a pointer to a root node of a B+ tree that is traversed for reads and writes that occur after the most recent snapshot was taken. Each time snapshot module 133 takes a snapshot, snapshot module 133 adds the running point to the entry of the immediately prior snapshot as the pointer to the root node of the B+ tree thereof, and creates a new running point in the manner further described below.

Figure 3:
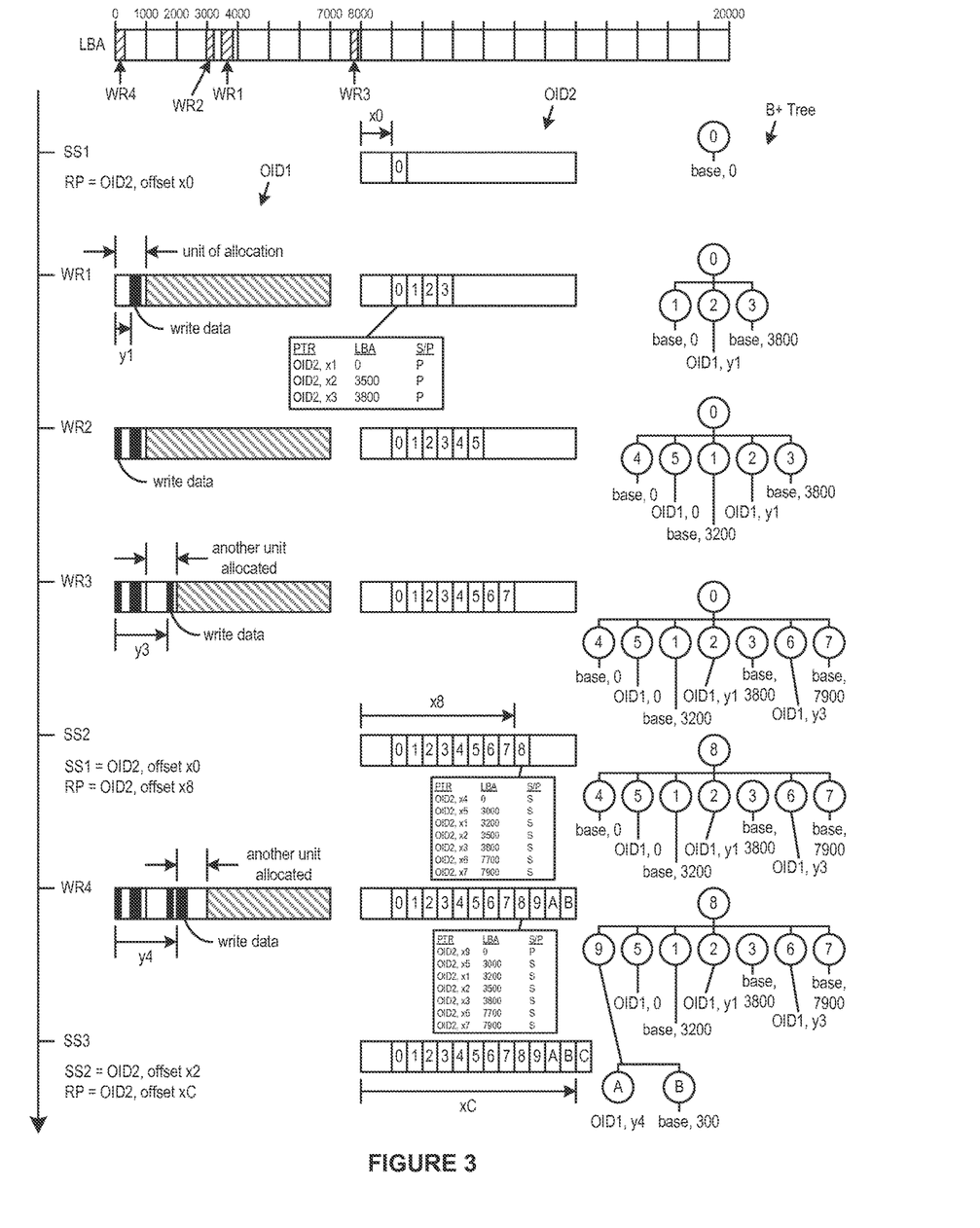
FIG. 3 is a schematic diagram that illustrates additional data structures, including B+ trees, for managing virtual disk snapshots according to an embodiment.

FIG. 3 is a schematic diagram that illustrates additional data structures, including B+ trees, for managing virtual disk snapshots according to an embodiment. FIG. 3 depicts the logical block address (LBA) space of virtual disk 210, the snapshot data storage object (OID1), and the snapshot metadata storage object (OID2), in linear arrays beginning at offset 0. FIG. 3 also schematically illustrates B+ trees associated with each of SS1 and SS2, the first having root node 0 and the second having root node 8.

A timeline is depicted along the left side of FIG. 3 and various events useful for illustrating the embodiments, such as snapshots (e.g., SS1, SS2, SS3) and writes (WR1, WR2, WR3, WR4) are depicted along this timeline. Alongside each of these events, FIG. 3 also illustrates the changes to the contents of the snapshot data storage object (OID1) and the snapshot metadata storage object (OID2), and the B+ trees.

The first event is a snapshot of virtual disk 210, SS1. In the example described herein, this snapshot is the very first snapshot of virtual disk 210, and so snapshot module 133 creates SMDS 220, which specifies the storage locations for the snapshot data storage object (OID1), the snapshot metadata storage object (OID2), and the snapshot log storage object (OID3). Snapshot module 133 also sets the running point RP to be at node 0 (whose contents are stored at storage location=OID2, offset x0), and updates node 0 to include a single pointer to the base data region of virtual disk 210. Thus, initially, subsequent to the event SS1, snapshot module 133 directs all read IOs (regardless of the LBA range targeted by the read IO) to the base data region of virtual disk 210.

The second event is a write IO to virtual disk 210, WR1. In the example of FIG. 3, WR1 is a write IO into the virtual disk at LBA=3500 and has a size that spans 300 LBAs. According to embodiments, instead of overwriting data in the base data region of virtual disk 210, the write data of WR1 is written into the snapshot data storage object through the following steps.

First, snapshot module 133 allocates an unused region in the snapshot data storage object. The size of this allocation is based on a unit of allocation that has been configured for the snapshot storage object. The unit of allocation is 4 MB in this example, but may be changed by the snapshot administrator. For example, the snapshot administrator may set the unit of allocation to be larger (>4 MB) if the snapshot data storage object is backed by a rotating disk array or to be smaller (<4 MB) if the snapshot data storage object is backed by solid state memory such as flash memory. In addition, in order to preserve the spatial locality of the data, snapshot module 133 allocates each region in the snapshot data storage object to span a contiguous range of LBAs (hereinafter referred to as the "LBA chunk") of the virtual disk beginning at one of the alignment boundaries of the virtual disk, for example, 0 and integer multiples of (unit of allocation)/(size of one LBA). In the example of FIG. 3, the size of one LBA is assumed to be 4 KB. Accordingly, the very first allocated region in the snapshot data storage object spans 1000 LBAs and the alignment boundary is at 3000, because WR1 is a write IO into the LBA range beginning at offset 3500.

Second, snapshot module 133 issues a write command to the snapshot data storage object to store the write data of WR1 in the allocated region at an offset equal to an offset from an alignment boundary of the LBA chunk spanned by the allocated region. In the example of FIG. 3, the allocated region spans LBA range 3000-3999, and so snapshot module 133 issues a write command to the snapshot data storage object to store the write data (having a size equal to 1.2 MB=300×4 KB) in the allocated region at an offset equal to 500 from the beginning of the allocated region. The offset from the beginning of the snapshot data storage object is also 500 (shown in Figure as y1) because the allocated region is the very first allocated region of the snapshot data storage object.

Third, snapshot module 133 updates the snapshot metadata of virtual disk 210 (in particular, the snapshot metadata storage object, OID2) by creating three additional nodes, nodes 1, 2, 3, and overwrites the contents of node 0 to convert node 0 from a leaf node (which points to data) to an index node (which points to one or more other nodes), so that node 0 includes the following information: (i) pointers to nodes 1, 2, 3, (ii) a beginning LBA for each pointer, and (iii) a private/shared flag for each pointer. More specifically, node 0 has three entries, one entry for each pointer. The first entry identifies storage location=OID2 and offset=x1 as the pointer to node 1, a beginning LBA of 0, and a P flag indicating that it points to a private node. The second entry identifies storage location=OID2 and offset=x2 as the pointer to node 2, a beginning LBA of 3500, and a P flag indicating that it points to a private node. The third entry identifies storage location=OID2 and offset=x3 as the pointer to node 3, a beginning LBA of 3800, and a P flag indicating that it points to a private node. Private nodes are those nodes whose contents may be overwritten without preserving the original contents. On the other hand, when a write IO targets an LBA and a shared node is traversed to find the data location corresponding to the targeted LBA, the contents of the shared node need to be preserved and a new node created. The handling of shared nodes is described below in conjunction with the write IO, WR4.

The B+ tree on the right side of FIG. 3 schematically illustrates the relationship of the nodes that are maintained in the snapshot metadata storage object after each event depicted in FIG. 3. The B+tree to the right of WR1 shows that node 0 now points to nodes 1, 2, 3, and nodes 1, 2, 3 point to data regions that together span the entire LBA range spanned by the base data region of virtual disk 210. Node 1 includes a pointer to the base data region of virtual disk 210 at an offset equal to 0. Node 2 includes a pointer to the snapshot data storage object at an offset equal to y1 (=500) Node 3 includes a pointer to the base data region of virtual disk 210 at an offset equal to 3800.

The third event is a write IO to virtual disk 210, WR2. In the example of FIG. 3, WR2 is a write IO into virtual disk at LBA=3000 and has a size that spans 200 LBAs. As with WR1, instead of overwriting data in the base data region of virtual disk 210, the write data of WR1 is written into the snapshot data storage object through the following steps.

First, snapshot module 133 detects that LBA at offset 3000 has been allocated already. Therefore, snapshot module 133 issues a write command to the snapshot data storage object to store the write data of WR2 in the allocated region at an offset equal to 0. The offset is 0 because the LBA 3000 falls on an alignment boundary. Then, snapshot module 133 creates two additional nodes, nodes 4, 5, and adds two pointers to these two nodes in node 0. More specifically, a first new entry in node 0 identifies storage location=OID2 and offset=x4 as the pointer to node 4, a beginning LBA of 0, and a P flag indicating that it points to a private node, and a second new entry in node 0 identifies storage location=OID2 and offset=x5 as the pointer to node 5, a beginning LBA of 3000, and a P flag indicating that it points to a private node. Snapshot module 133 also modifies the beginning LBA for the pointer to node 1 from 0 to 3200.

The B+ tree to the right of WR2 shows that node 0 now points to nodes 4, 5, 1, 2, 3, and nodes 4, 5, 1, 2, 3 point to data regions that together span the entire LBA range spanned by the base data region of virtual disk 210. Node 4 includes a pointer to the base data region of virtual disk 210 at an offset equal to 0. Node 5 includes a pointer to the snapshot data storage object at an offset equal to 0. Node 1 includes a pointer to the base data region of virtual disk 210 at an offset equal to 3200. Node 2 includes a pointer to the snapshot data storage object at an offset equal to y1 (=500). Node 3 includes a pointer to the base data region of virtual disk 210 at an offset equal to 3800.

The fourth event is a write IO to virtual disk 210, WR3. In the example of FIG. 3, WR3 is a write IO into virtual disk at LBA=7700 and has a size that spans 200 LBAs. As with WR1 and WR2, instead of overwriting data in the base data region of virtual disk 210, the write data of WR3 is written into the snapshot data storage object through the following steps.

First, snapshot module 133 allocates a new unused region in the snapshot data storage object because the previously allocated region does not span the LBA targeted by WR3. In the example of FIG. 3, the size of the newly allocated region is again 4 MB.

Second, snapshot module 133 issues a write command to the snapshot data storage object to store the write data of WR3 in the newly allocated region at an offset equal to an offset from an alignment boundary of the LBA chunk spanned by the newly allocated region. In the example of FIG. 3, the newly allocated region spans LBA range 7000-7999, and so snapshot module 133 issues a write command to the snapshot data storage object to store the write data (having a size equal to 800 KB (200×4 KB)) in the allocated region at an offset equal to 700 from the beginning of the newly allocated region. The offset from the beginning of the snapshot data storage object is 700+1000 (shown in Figure as y3) because the newly allocated region is the second allocated region of the snapshot data storage object.

Third, snapshot module 133 creates two additional nodes, nodes 6, 7, and adds two pointers to these two nodes in node 0. More specifically, a first new entry in node 0 identifies storage location=OID2 and offset=x6 as the pointer to node 6, a beginning LBA of 7700, and a P flag indicating that it points to a private node, and a second new entry in node 0 identifies storage location=OID2 and offset=x7 as the pointer to node 7, a beginning LBA of 7900, and a P flag indicating that it points to a private node.

The B+tree to the right of WR3 shows that node 0 now points to nodes 4, 5, 1, 2, 3, 6, 7 and nodes 4, 5, 1, 2, 3, 6, 7 point to data regions that together span the entire LBA range spanned by the base data region of virtual disk 210. Node 4 includes a pointer to the base data region of virtual disk 210 at an offset equal to 0. Node 5 includes a pointer to the snapshot data storage object at an offset equal to 0. Node 1 includes a pointer to the base data region of virtual disk 210 at an offset equal to 3200. Node 2 includes a pointer to the snapshot data storage object at an offset equal to y1 (=500). Node 3 includes a pointer to the base data region of virtual disk 210 at an offset equal to 3800. Node 6 includes a pointer to the snapshot data storage object at an offset equal to y3 (=1700). Node 7 includes a pointer to the base data region of virtual disk 210 at an offset equal to 7900.

The fifth event is a snapshot of virtual disk 210, SS2. In the example described herein, this snapshot is the second snapshot of virtual disk 210, and so snapshot module 133 updates SMDS 220 to set the running point RP to be at node 8 (which is located at OID2 at offset x8) and to set the storage location of the root node of the B+tree for SS1 to be the old running point, namely node 0 which is located at OID2 at offset=x0. The contents of node 8 are identical to the contents of node 0 except all pointers of node 8 have S flags, indicating that they all point to shared nodes.

The sixth event is a write IO to virtual disk 210, WR4. In the example of FIG. 3, WR4 is a write IO into virtual disk at LBA=0 and has a size that spans 300 LBAs. As with the previous writes, instead of overwriting data in the base data region of virtual disk 210, the write data of WR4 is written into the snapshot data storage object through the following steps.

First, snapshot module 133 allocates a new unused region in the snapshot data storage object because the previously allocated regions do not span the LBA targeted by WR4. In the example of FIG. 3, the size of the newly allocated region is again 4 MB.

Second, snapshot module 133 issues a write command to the snapshot data storage object to store the write data of WR4 in the newly allocated region at an offset equal to an offset from an alignment boundary of the LBA chunk spanned by the newly allocated region. In the example of FIG. 3, the newly allocated region spans LBA range 0000-0999, and so snapshot module 133 issues a write command to the snapshot data storage object to store the write data (having a size equal to 1.2 MB=300×4 KB) in the newly allocated region at an offset equal to 0 from the beginning of the newly allocated region. The offset from the beginning of the snapshot data storage object is 700+2000 (shown in Figure as y4) because the newly allocated region is the third allocated region of the snapshot data storage object.

Third, snapshot module 133 detects that shared node 4 is traversed to find the data location corresponding to the LBA targeted by WR4 (i.e., LBA=0). Upon detecting this, snapshot module 133 creates a new index node, node 9, and modifies node 8 so that the pointer to node 4 now points to node 9 and is flagged as P instead of S. Snapshot module 133 also creates two additional nodes, nodes A, B, and adds two pointers to these two nodes in node 9. More specifically, a first new entry in node 9 identifies storage location=OID2 and offset=xA as the pointer to node A, a beginning LBA of 0, and a P flag indicating that it points to a private node, and a second new entry in node 9 identifies storage location=OID2 and offset=xB as the pointer to node B, a beginning LBA of 300, and a P flag indicating that it points to a private node.

The B+ tree to the right of WR4 shows that node 9 now points to nodes A, B and nodes A, B, 5, 1, 2, 3, 6, 7 point to data regions that together span the entire LBA range spanned by the base data region of virtual disk 210. Node A includes a pointer to the snapshot data storage object at an offset equal to y4 (=2700). Node B includes a pointer to the base data region of virtual disk 210 at an offset equal to 300. Node 5 includes a pointer to the snapshot data storage object at an offset equal to 0. Node 1 includes a pointer to the base data region of virtual disk 210 at an offset equal to 3200. Node 2 includes a pointer to the snapshot data storage object at an offset equal to y1 (=500). Node 3 includes a pointer to the base data region of virtual disk 210 at an offset equal to 3800. Node 6 includes a pointer to the snapshot data storage object at an offset equal to y3 (=700). Node 7 includes a pointer to the base data region of virtual disk 210 at an offset equal to 7900.

The seventh event is a snapshot of virtual disk 210, SS3. In the example described herein, this snapshot is the third snapshot of virtual disk 210, and so snapshot module 133 updates SMDS 220 to set the running point RP to be at node C (which is located at OID2 at offset xC) and to set the storage location of the root node of the B+ tree for SS2 to be the old running point, namely node 8 which is located at OID2 at offset=x8. The contents of node C are identical to the contents of node 8 except all pointers of node C have S flags, indicating that they all point to shared nodes.

Figure 4A:
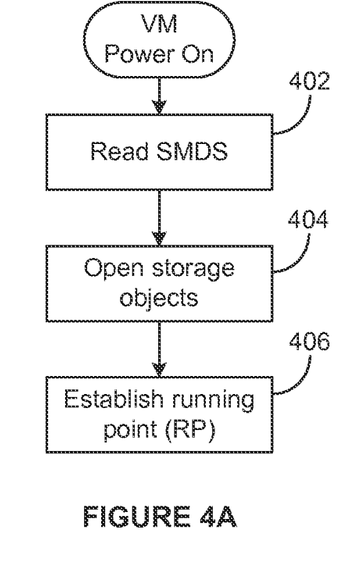
FIG. 4A depicts a flow diagram of method steps that are carried out in connection with opening storage objects that are needed to manage snapshots according to an embodiment.

FIG. 4A depicts a flow diagram of method steps that are carried out in connection with opening storage objects that are needed to manage snapshots according to an embodiment. The steps of the flow diagram depicted in FIG. 4A are executed by snapshot module 133 in synchronous response to a VM power-on event. At step 402, snapshot module 133 reads the contents of the SMDS for each virtual disk provisioned for the powered-on VM. Then, at step 404, snapshot module 133 opens the storage objects referenced in the SMDS. In the example of SMDS 220 shown in FIG. 2, OID1, OID2, and OID3 are opened and handles for these storage objects established. At step 406, the running point read from the SMDS is established as the current running point, i.e., a pointer to a root node of a B+ tree that is traversed for reads and writes.

Figure 4B:
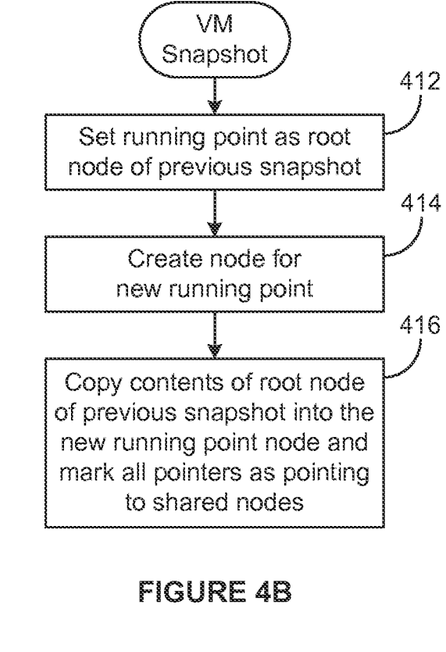
FIG. 4B depicts a flow diagram of method steps that are carried out in connection with taking snapshots according to an embodiment.

FIG. 4B depicts a flow diagram of method steps that are carried out in connection with taking snapshots according to an embodiment. The steps of the flow diagram depicted in FIG. 4B are executed by snapshot module 133 in synchronous response to a request for a VM snapshot. At step 412, snapshot module 133 records the root node pointed to by the current running point in the SMDS as the root node of the most recent prior snapshot. Then, at step 414, snapshot module 133 creates a node for the new running point. At step 416, snapshot module 133 copies contents of the root node of the most recent prior snapshot into the new running point node, and marks all pointers in the new running point node as pointing to shared nodes.

Figure 4C:
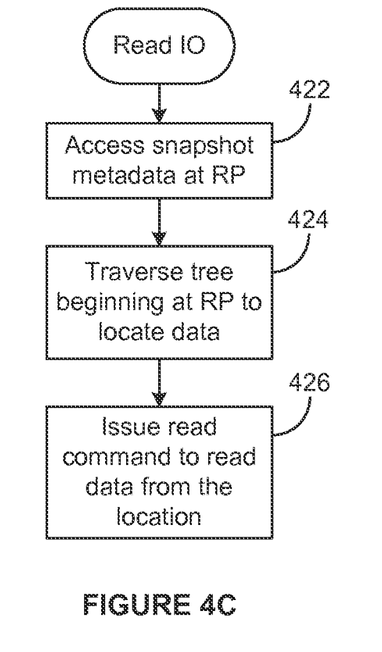
FIG. 4C depicts a flow diagram of method steps that are carried out to process a read IO on a virtual disk having one or more snapshots that have been taken according to an embodiment.

FIG. 4C depicts a flow diagram of method steps that are carried out to process a read IO on a virtual disk having one or more snapshots that have been taken according to an embodiment. The steps of the flow diagram depicted in FIG. 4C are executed by snapshot module 133 in synchronous response to a read IO to the virtual disk. At step 422, snapshot module 133 accesses the root node of the B+ tree using the established running point. Then, at step 424, snapshot module 133 traverses the nodes of the B+ tree using the LBA targeted by the read IO to arrive at a leaf node that points to a data location in the base region of virtual disk 210 or the snapshot data storage object, as the case may be. At step 426, snapshot module 133 issues a read command to read the data location pointed to by the leaf node.

Figure 4D:
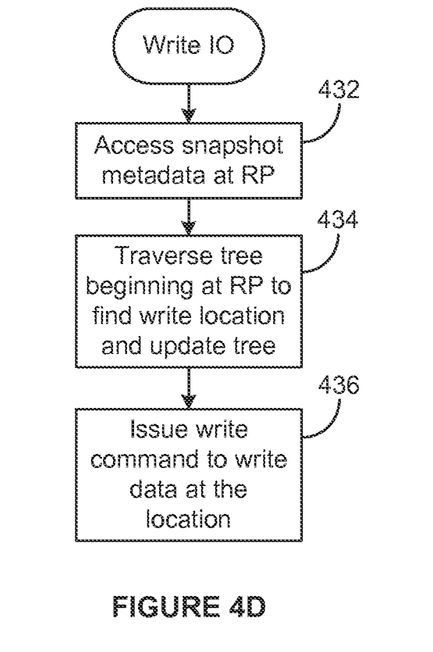
FIG. 4D depicts a flow diagram of method steps that are carried out to process a write IO on a virtual disk having one or more snapshots that have been taken according to an embodiment.

FIG. 4D depicts a flow diagram of method steps that are carried out to process a write IO on a virtual disk having one or more snapshots that have been taken according to an embodiment. The steps of the flow diagram depicted in FIG. 4D are executed by snapshot module 133 in synchronous response to a write IO to the virtual disk. At step 432, snapshot module 133 accesses the root node of the B+ tree using the established running point. Then, at step 434, snapshot module 133 traverses the nodes of the B+tree using the LBA targeted by the write JO to create at least one leaf node that points a data location in the snapshot data storage object where the data is to be written. The corresponding updates to the B+ tree stored in the snapshot metadata storage object are carried out in the same manner as described above in conjunction with FIG. 3. Then, at step 436, snapshot module 133 issues a write command to write data into the data location pointed to by the leaf node.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims.

In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of processing write requests to a virtual disk for which a first snapshot has been taken, comprising:
   in response to a first write request received after taking the first snapshot and prior to taking a second snapshot, accessing a root node of a first tree data structure, traversing the first tree data structure starting at the root node to find a node associated with a logical address targeted by the first write request, issuing a first write command to store first write data associated with the first write request in a snapshot data storage object, and updating the first tree data structure to add a new node that includes a pointer to a location in the snapshot data storage object where the first write data is stored; and
   in response to a second write request received after taking the second snapshot, accessing a root node of a second tree data structure, traversing the second tree data structure starting at the root node to find a node associated with a logical address targeted by the second write request, issuing a second write command to store second write data associated with the second write request in the snapshot data storage object, and updating the second tree data structure to add a new node that includes a pointer to a location in the snapshot data storage object where the second write data is stored,
   wherein the snapshot data storage object is identified by a first object identifier (OID) and the first and second tree data structures are stored in the same snapshot metadata storage object that is identified by a second OID.

2. The method of claim 1, wherein storage space for the snapshot data storage object is allocated in units of N megabytes, N being a configurable number, and each unit of N megabytes of data in the snapshot data storage object correspond to a contiguous range of logical addresses of the virtual disk.

3. The method of claim 1, wherein storage locations of the root node of the first and second tree data structures are each stored in a snapshot management data structure as an OID and corresponding offset, and a mapping of each OID to a storage location of the corresponding storage object is also stored in the snapshot management data structure.

4. The method of claim 3, wherein each of the first OID and the second OID maps to a storage object that is of a type different that of the virtual disk.

5. The method of claim 3, wherein the virtual disk is a file and the first OID and the second OID also map to files.

6. The method of claim 1, wherein the second tree data structure includes the root node, index nodes, and leaf nodes, each of the leaf nodes including a pointer to a data location, and the second tree data structure is traversed from the root node to one of the leaf nodes associated with the logical address targeted by the second write request, through one or more of the index nodes.

7. The method of claim 6, wherein the root node of the second tree data structure includes pointers to a lower level node, and each of the pointers of the root node are indicated as being of first or second type, the first type being indicated if the root node from the first tree data structure has a pointer to the same lower level node, and the second type being indicated if the root node from the first tree data structure does not have a pointer to the same lower level node.

8. The method of claim 7, further comprising:
   if the second tree data structure is traversed from the root node to a lower level node of the first type, updating the second tree data structure to add an index node of the second type that replaces the lower level node of the first type and to redirect the pointer in the root node that points to the lower level node of the first type to the added index node.

9. The method of claim 8, wherein the added index node includes a pointer to the new node that includes the pointer to the location in the snapshot data storage object where the second write data is stored.

10. The method of claim 7, further comprising:
    if the second tree data structure is traversed from the root node to a lower level node of the first type and the lower level node is an index node, updating the second tree data structure to add multiple index nodes of the second type and to redirect the pointer in the root node that points to the lower level node of the first type to one of the added index nodes,
    wherein one of the added index nodes includes a pointer to the new node that includes the pointer to the location in the snapshot data storage object where the second write data is stored.

11. A non-transitory computer readable medium comprising instructions to be executed in a computer system to carry out a method of processing write requests to a virtual disk for which a first snapshot has been taken, said method comprising:
    in response to a first write request received after taking the first snapshot and prior to taking a second snapshot, accessing a root node of a first tree data structure, traversing the first tree data structure starting at the root node to find a node associated with a logical address targeted by the first write request, issuing a first write command to store first write data associated with the first write request in a snapshot data storage object, and updating the first tree data structure to add a new node that includes a pointer to a location in the snapshot data storage object where the first write data is stored; and in response to a second write request received after taking the second snapshot, accessing a root node of a second tree data structure, traversing the second tree data structure starting at the root node to find a node associated with a logical address targeted by the second write request, issuing a second write command to store second write data associated with the second write request in the snapshot data storage object, and updating the second tree data structure to add a new node that includes a pointer to a location in the snapshot data storage object where the second write data is stored, wherein the snapshot data storage object is identified by a first object identifier (OID) and the first and second tree data structures are stored in the same snapshot metadata storage object that is identified by a second OID.

12. The non-transitory computer readable medium of claim 11, wherein storage locations of the root node of the first and second tree data structures are each stored in a snapshot management data structure as an OID and corresponding offset, and a mapping of each OID to a storage location of the corresponding storage object is also stored in the snapshot management data structure.

13. The non-transitory computer readable medium of claim 12, wherein the first OID and the second OID maps to a storage object that is of a type different that of the virtual disk.

14. The non-transitory computer readable medium of claim 12, wherein the virtual disk is a file and the first OID and the second OID also maps to files.

15. The non-transitory computer readable medium of claim 11, wherein the second tree data structure includes the root node, index nodes, and leaf nodes, each of the leaf nodes including a pointer to a data location, and the second tree data structure is traversed from the root node to one of the leaf nodes associated with the logical address targeted by the second write request, through one or more of the index nodes.

16. The non-transitory computer readable medium of claim 15, wherein the root node of the second tree data structure includes pointers to a lower level node, and each of the pointers of the root node are indicated as being of first or second type, the first type being indicated if the root node from the first tree data structure has a pointer to the same lower level node, and the second type being indicated if the root node from the first tree data structure does not have a pointer to the same lower level node.

17. The non-transitory computer readable medium of claim 16, wherein the method further comprises:
if the second tree data structure is traversed from the root node to a lower level node of the first type, updating the second tree data structure to add an index node of the second type that replaces the lower level node of the first type and to redirect the pointer in the root node that points to the lower level node of the first type to the added index node.

18. The non-transitory computer readable medium of claim 17, wherein the added index node includes a pointer to the new node that includes the pointer to the location in the snapshot data storage object where the second write data is stored.

19. The non-transitory computer readable medium of claim 16, wherein the method further comprises:
if the second tree data structure is traversed from the root node to a lower level node of the first type and the lower level node is an index node, updating the second tree data structure to add multiple index nodes of the second type and to redirect the pointer in the root node that points to the lower level node of the first type to one of the added index nodes,
wherein one of the added index nodes includes a pointer to the new node that includes the pointer to the location in the snapshot data storage object where the second write data is stored.

20. A computer system, comprising:
system hardware, the system hardware including one or more processors and a system memory;
virtualization software supporting execution of a virtual computing instance and provisioning a virtual disk for the computing instance, the virtualization software including a snapshot management module that is programmed to process write requests to the virtual disk for which a first snapshot has been taken and a second snapshot after the first snapshot,
wherein said snapshot management module
in response to a first write request received after taking the first snapshot and prior to taking the second snapshot, access a root node of a first tree data structure, traverses the first tree data structure starting at the root node to find a node associated with a logical address targeted by the first write request, issues a first write command to store first write data associated with the first write request in a snapshot data storage object, and updates the first tree data structure to add a new node that includes a pointer to a location in the snapshot data storage object where the first write data is stored; and
in response to a second write request received after taking the second snapshot, accesses a root node of a second tree data structure, traverses the second tree data structure starting at the root node to find a node associated with a logical address targeted by the second write request, issues a second write command to store second write data associated with the second write request in the snapshot data storage object, and updates the second tree data structure to add a new node that includes a pointer to a location in the snapshot data storage object where the second write data is stored, and
wherein the snapshot data storage object is identified by a first object identifier (OID) and the first and second tree data structures are stored in the same snapshot metadata storage object that is identified by a second OID.

* * * * *